Sept. 23, 1958 R. L. ROPIEQUET ET AL 2,853,609

MULTIVIBRATOR HOLD OFF CIRCUIT

Filed Feb. 21, 1955 2 Sheets-Sheet 1

INVENTORS
Richard L. Ropiequet
John R. Kobbe

BY Oliver D. Olson
Agent

MULTIVIBRATOR HOLD OFF CIRCUIT

Filed Feb. 21, 1955 2 Sheets-Sheet 2

INVENTORS
Richard L. Ropiequet
BY and John R. Kobbe

Agent

United States Patent Office 2,853,609
Patented Sept. 23, 1958

2,853,609

MULTIVIBRATOR HOLD OFF CIRCUIT

Richard L. Ropiequet, Portland, and John R. Kobbe, Beaverton, Oreg., assignors to Tektronix, Inc, Portland, Oreg., a corporation of Oregon Application February 21, 1955, Serial No. 489,614
20 Claims. (Cl. 250—27)

This invention relates to trigger circuits, and relates particularly to a novel method and circuit arrangement for use with a multivibrator to prevent actuation of the latter through premature triggering by random or other trigger signals during a desired cycle of multivibrator action.

The present application is a continuation-in-part of Serial No. 374,849, filed August 18, 1953, now abandoned for Method of Controlling the Triggering of a Multivibrator and Hold-Off Circuit Therefor, by Richard L. Ropiequet.

In circuitry provided, for example, in cathode-ray oscilloscopes for the generation of a sawtooth waveform time base, it is sometimes the practice to provide a multivibrator of the direct coupled type which has no timing circuit components, and therefore the recovery time of the multivibrator is necessarily quite short. Accordingly, in order to prevent faulty operation it is required that means be provided to prevent the multivibrator from being triggered before the sawtooth generator has returned to its quiescent state, i. e. before the sweep capacitor is completely discharged. Similarly, mono-stable multivibrators provide recovery times shorter than the recovery time of the sawtooth generator, and therefore the same precaution must be taken.

One means for achieving this result is to utilize the recovery waveform of the multivibrator or the sawtooth waveform of a sweep generator to disconnect the multivibrator from the trigger source. However, each of these waveforms has a region of voltage and time change near the end of their recovery period, and it is in this region that the presence of a trigger signal is capable of causing premature re-triggering of the multivibrator. Furthermore, this method does not control the operation of the multivibrator and therefore, although it may be effective in preventing premature triggering by external signals, it cannot prevent premature operation of the multivibrator when the latter is in a free-running condition.

Another means for achieving this result involves the circuitry of the multivibrator in arrangements which prevent the multivibrator from recovering until a definite time has elapsed from the termination of the sawtooth sweep. At this time the multivibrator is then permitted to recover, but since the circuit elements of the multivibrator have certain characteristic recovery times themselves, it frequently occurs that a trigger pulse will be impressed upon the multivibrator to trigger the latter before complete recovery has been achieved.

It is the primary object of the present invention to provide a method and hold-off circuit by means of which premature or otherwise undesirable trigger signals are prevented from triggering a multivibrator during the desired cycle of operation of said multivibrator by positive means not subject to the characteristics and to changes in the characteristics of the circuit components of the multivibrator.

Another important object of this invention is to provide a hold-off circuit which is adjustable, whereby to provide for variable periods of delay before permitting a trigger signal to re-trigger the multivibrator.

A further important object of this invention is the provision of a hold-off circuit which is adjustable in such manner that the multivibrator may be reset by means of external triggers which may be controlled automatically or manually, as may be desired.

Still another important object of this invention is the provision in a multivibrator-triggered sweep circuit of a hold-off circuit which employs the output sweep waveform to control the stability of the multivibrator.

A further important object of this invention is the provision of a hold-off circuit which functions to control the stability of a multivibrator and to prevent for a predetermined time its being triggered, by maintaining the control element thereof at a level of potential which is incapable of effecting said triggering.

A still further object of the present invention is the provision of a hold-off circuit of the class described which is faithful in operation and is of simplified construction for economical manufacture.

These and other objects and advantages of the present invention will appear from the following detailed description taken in connection with the accompanying drawing, in which.

Stated broadly, the method and hold-off circuit of this invention is associated with a multivibrator whose triggering is effected at a predetermined level of potential applied to a suitable control element, and involves the control of said potential in such manner as to delay the return of said control element to the triggering level for a predetermined time after reversion of the multivibrator.

Figure 1:
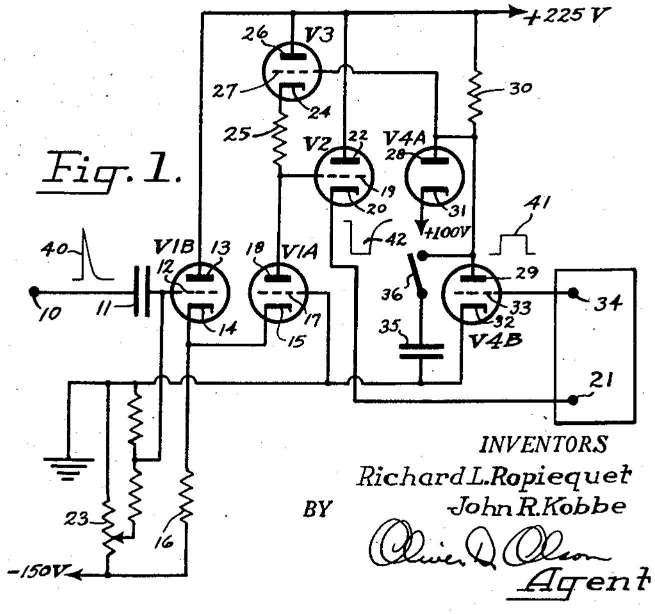
Figure 1 is a schematic diagram of one form of hold-off circuit embodying the features of the present invention.

Referring to Figure 1 of the drawing, wherein is shown one form of the hold-off circuit of the present invention, input terminal 10 is connected through capacitance 11 to the grid 12 of the B section of a cathode-coupled amplifier V1. The plate 13 of section V1B is connected to a positive potential, as shown, and the cathodes 14 and 15 of sections V1B and V1A, respectively, are connected through resistance 16 to a negative potential. The grid 17 of section V1A is grounded, while the plate 18 of said output section is direct-coupled through cathode-follower V2 via grid 19, cathode 20 and terminal 21 to the normally conducting side of a multivibrator, such as the direct coupled, bistable type illustrated in Figure 6. The plate 22 of V2 is connected to a positive potential, as shown.

The grid of V1B is also connected to a bias-control potentiometer 23 for establishing the proper direct current-resting level of plate 18, as explained hereinafter.

The cathode 24 of cathode follower V3 is connected through resistance 25 to the junction of the grid 19 of V2 and the plate 18 of V1A. The plate 26 of V3 is connected to a positive potential, as shown. The grid 27 of V3 is connected to the plate 28 of V4A and to the plate 29 of V4B, and also through resistance 30 to a positive potential, as shown. The cathode 31 of diode V4A is connected to a lower positive potential, as explained in detail hereinafter. The cathode 32 of V4B is grounded, while the grid 33 is connected at terminal 34 to a signal producing element of the multivibrator, such as the control grid of the normally non-conducting side thereof.

A capacitor 35 is connected through switch 36 between the plate 29 of V4B and ground, for purposes explained in detail hereinafter.

For purposes of describing the operation of the hold-off circuit of the present invention, let it be assumed that the negative potential to which the cathodes of the amplifier V1 are connected is −150 volts, that the positive potential to which the plates of V1B, V2 and V3 are connected is +225 volts, and that the positive potential to which the cathode of V4A is connected is +100 volts. The trigger amplifier V1 is further assumed to be designed in such manner that it will trigger the multivibrator only when its plate 18 is in the vicinity of 100 volts.

With the system connected between a trigger generator and a multivibrator in the manner described hereinbefore, a sharp differentiated positive trigger signal 40, generated in any well-known manner, is impressed upon the grid 12 of the input section V1B of the cathode-coupled amplifier V1. This differentiated trigger signal must have a time duration which is shorter than the recovery time T (Figure 2) of the hold-off circuit, which recovery time is approximately equal to 0.8 RC, wherein R is the resistance 30 and C is the timing capacitor 35. For recovery time delays of less than about one micro second the stray capacitance of circuit may be sufficient, in which case capacitor 35 may be omitted.

The positive trigger signal is impressed upon the grid 19 of the cathode follower V2, whereupon current is diverted from the normally conducting side of the multivibrator, producing a positive step 41 which is coupled to the grid of the normally non-conducting side of the multivibrator, causing said multivibrator to flop over with conduction on the normally non-conducting side.

During conduction of the normally non-conducting side of the multivibrator, V4B also conducts to discharge the timing capacitor 35. At the end of conduction of the normally non-conducting side of the multivibrator, V4B is cut off and its plate begins to rise toward +225 volts. However, the charge period of capacitor 35 is slow, and therefore the rise in plate voltage is delayed. When the plate of V4B reaches 100 volts, it is clamped to this voltage by diode V4A. As stated hereinbefore, the trigger amplifier V1 is so designed that it will trigger the multivibrator only when its plate is in the vicinity of 100 volts, and therefore triggering of the multivibrator is prevented during the slow rise of the plate of V4B to 100 volts.

Figure 2:
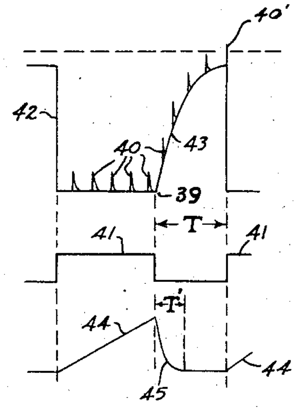
Figure 2 is a graph showing the triggering waveform for the multivibrator and illustrating the operation of the hold-off circuit of Figure 1.

In Figure 2 of the drawing there is shown the positive step 41 impressed upon the normally non-conducting side of the multivibrator and upon the grid 33 of V4B, and the corresponding negative pulse 42 at the plate 18 of V1A. Thus, during conduction of the normally non-conducting side of the multivibrator the plate 18 of V1A drops in voltage to a magnitude at which the trigger signals 40 have no effect. At the termination of conduction of the normally non-conducting side of the multivibrator, indicated at 39 in Figure 2, the plate 29 of V4B begins to rise in accordance with the charging time curve 43 of capacitor 35. The multivibrator is prevented from being triggered during this charging time until the plate 18 of V1A approaches 100 volts. When this condition is reached, however, a trigger signal, indicated at 40′ in Figure 2 and applied at terminal 10, is again capable of triggering the multivibrator.

In Figure 2 there is also shown, for purposes of illustration, a sawtooth waveform which constitutes the time base for a cathode-ray oscilloscope. After the triggering of the multivibrator and during conduction of the normally non-conducting side thereof, as illustrated by the positive step 41, the sawtooth wave generator produces the linear portion 44 of the sawtooth waveform. However, when the multivibrator reverts with conduction on the normally conducting side, the sawtooth generator is inactivated and the sawtooth waveform voltage decays along the exponential curve 45, which decay time is indicated by T′. The value of T′ will vary, depending upon the characteristic and magnitude of the sawtooth waveform, but in any event the hold-off circuit must be capable of preventing multivibrator action for a time greater than T′. Thus, the value of capacitor 35 is dependent primarily upon the size of the timing capacitor of the sweep generator.

Figure 3:
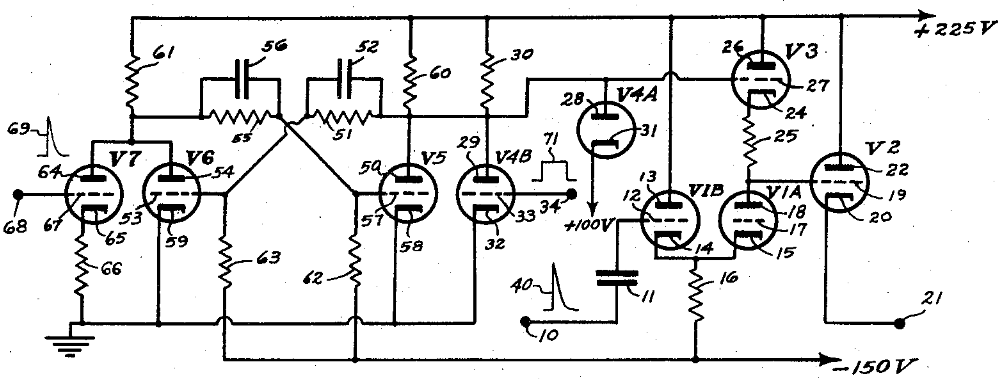
Figure 3 is a schematic diagram of a modified form of hold-off circuit embodying the features of the present invention.

Referring now to Figure 3 of the drawing, there is shown a modified arrangement of a hold-off circuit wherein a multivibrator is employed to perform the function of the capacitor 35 previously described. Tubes V5 and V6 are coupled together in conventional manner, as follows: The plate 50 of tube V5 is coupled through the parallel combination of resistance 51 and capacitor 52 to the grid 53 of tube V6. The plate of tube V6 is coupled through the parallel combination of resistance 55 and capacitor 56 to the grid 57 of tube V5. The cathodes of 58 and 59 of tubes V5 and V6, respectively, are grounded. The plate 50 of tube V5 is connected through resistance 60 to a positive potential, for example 225 volts, and the plate 54 of tube V6 is connected through resistance 61 to said positive potential. The grids of tubes V5 and V6 are each connected through resistances 62 and 63, respectively, to a negative potential of, for example, −150 volts.

The plate 64 of amplifier tube V7 is connected to the plate 54 of tube V6, while the cathode 65 is connected through resistance 66 to ground. The grid 67 of tube V7 is connected to terminal 68 at which external trigger pulses 69 are impressed, for purposes explained in detail hereinafter.

In the manner of the modification first described hereinbefore, a sharp differentiated positive trigger signal 40 is impressed upon the grid 12 of the input section V1B of the cathode-coupled amplifier V1. This signal is then impressed upon the grid 19 of the cathode follower V2, whereupon the multivibrator flops over, with conduction on the normally non-conducting side. V4B is caused to conduct during conduction of the normally non-conducting side of the multivibrator, thereby causing the hold-off multivibrator to revert with the right hand tube V5 conducting. During conduction of V4B the hold-off multivibrator is prevented from being triggered by a trigger pulse 69. At the end of conduction of the normally non-conducting side of the multivibrator, V4B is cut off. However, V5 continues to conduct until a trigger pulse 69 is impressed through amplifier V7 to revert the multivibrator. Thus, it is possible to arrange for the introduction of a trigger pulse 69 at a time determined to be delayed sufficiently for the multivibrator to become fully recovered. This trigger pulse 69 may be provided in any manner well-known in the art, such as by a timed trigger generator or by a manually operated trigger generator.

Figure 4:
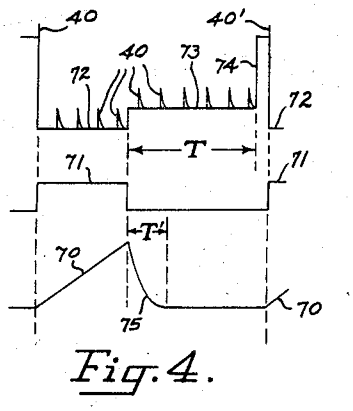
Figure 4 is a graph showing the triggering waveform for the multivibrator and illustrating the operation of the hold-off circuit of Figure 3.

Referring to Figure 4 of the drawing, the waveforms shown illustrate the use of the device in a system for generating a sawtooth waveform time base for a cathode-ray oscilloscope. The trigger signal 40 triggers the multivibrator and the linearly rising sawtooth voltage 70 is produced during the conduction of the normally non-conducting side of the multivibrator, as indicated by the positive step 71. During this time tubes V4B and V5 conduct, as indicated by the section 72 of the negative waveform. At the termination of the sawtooth sweep and the positive gate 71, V4B is cut off and V5 continues to conduct, as indicated by section 73 of the negative waveform. The termination of the negative waveform, as indicated at 74 is controlled by the application of the external trigger signal 69. As in the waveforms shown in Figure 2 and described hereinbefore, the time T from the termination of the sweep 70 to the resetting of the multivibrator must be longer than the time T' of the exponential decay 75 of the sawtooth waveform.

Figure 5:
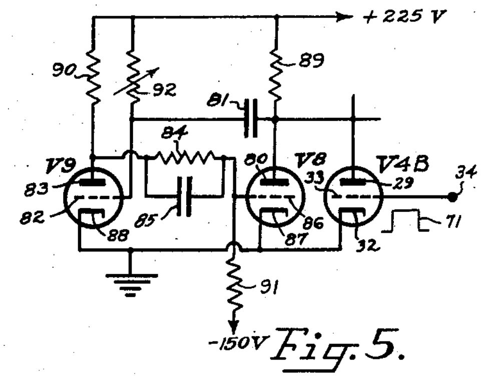
Figure 5 is a schematic diagram of a still further modified form of hold-off circuit embodying the features of the present invention.

Referring now to Figure 5 of the drawing, there is shown a still further modified form of hold-off circuit which, as in the modification of Figure 3, utilizes a multivibrator in substitution of the capacitor 35 employed in the modification of Figure 1. The plate 80 of tube V8 is connected to the plate 29 of tube V4B, in the manner previously described. This plate 80 is also connected through timing capacitor 81 to the grid 82 of tube V9. The plate 83 of tube V9 is coupled through the parallel combination of resistance 84 and capacitor 85 to the grid 86 of tube V8. The cathodes 87 and 88 of the respective tubes V8 and V9 are grounded. Plate 80 of tube V8 is also connected through resistance 89 to a positive potential, for example 225 volts, as indicated, and the plate 83 of tube V9 is also connected through resistance 90 to said positive potential. The grid 86 of tube V8 is connected through resistance 91 to a negative potential of, for example, −150 volts, and the grid 82 of tube V9 is connected through resistance 92, preferably of the variable type, to the positive potential of 225 volts.

The operation of the hold-off circuit shown in Figure 5 is similar to that of the circuit of Figure 3 with the exception that no external trigger signal is required to reset the multivibrator V8, V9. When a trigger signal 40 is impressed upon the normally conducting side of the multivibrator and the latter flops over with conduction on the normally non-conducting side, the positive gate 71 impressed upon the grid 33 of tube V4B causes conduction of this tube and also of tube V8, with simultaneous discharge of capacitor 81. At the end of conduction of the normally non-conducting side, as upon termination of a generated sweep waveform shown in Figure 4, tube V4B is cut off and tube V8 continues to conduct for a time determined by the RC constant of resistance 92 and capacitor 81 at which time tube V9 is brought into conduction to revert the multivibrator. By the provision of variable resistance 92, the delay in reverting the multivibrator may be controlled as desired. Referring to Figure 4, this time delay must be sufficient to accommodate a time equal to the sum of the duration of the sweep 70 and the exponential decay 75 of the sawtooth waveform following the termination of the sweep.

The negative waveform shown in Figure 4 also represents the waveform obtained by operation of the circuit shown in Figure 5. In this instance, however, the termination of the negative waveform at 74 results from the reversion of the multivibrator as controlled by the RC network, rather than by the externally impressed trigger signal 69 in the modification of Figure 3.

Figures 6, 7:
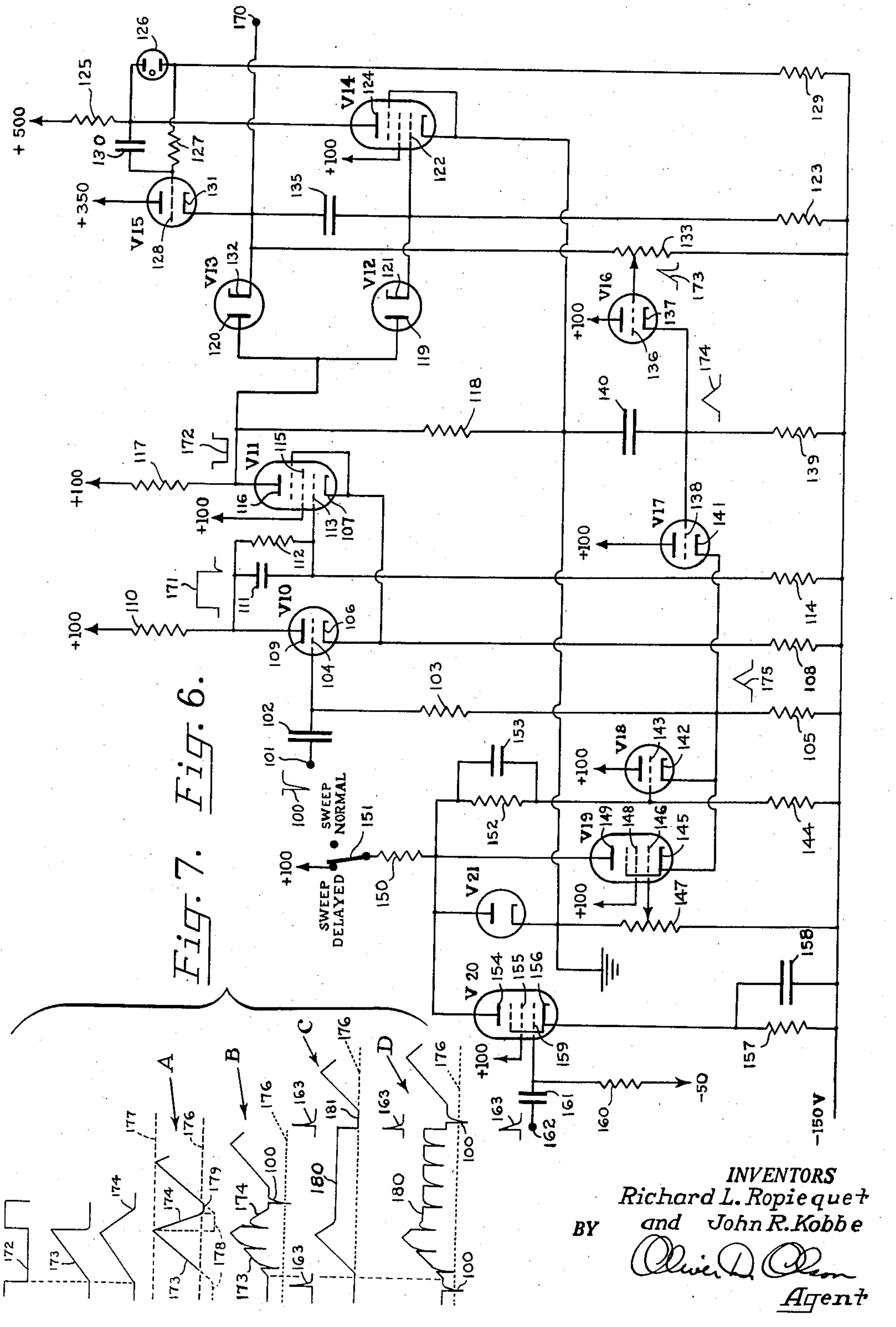
Figure 6 is a schematic diagram of a still further modified form of hold-off circuit embodying the features of the present invention.
Figure 7 is a graph showing the hold-off waveform of the circuit of Figure 6.

In Figure 6 of the drawings, the bistable multivibrator is shown to control the operation of a sweep generator, the output waveform of which is fed back to the multivibrator input and functions as the hold-off waveform. The source of trigger signals 100 is connected to terminal 101 which is connected through a differentiating network comprising capacitance 102 and resistance 103 to the grid 104 of multivibrator tube V–10. The time constant of the differentiating network is short, in order to limit the size of trigger signals. Grid 104 is connected through resistance 103 to the common cathode connection of V17, V18 and V19 discussed hereinafter, said cathode connection being returned through resistance 105 to a negative potential, such as the −150 volts indicated.

The cathode 106 of tube V10 is connected to the cathode 107 of multivibrator tube V11, and these cathodes are returned to a negative potential through resistance 108. The plate 109 of tube V10 is connected through resistance 110 to a positive potential, such as the 100 volts indicated, and also through the parallel combination of capacitance 111 and resistance 112 to the grid 113 of tube V11. This grid is returned to the negative potential indicated through resistance 114. The screen grid 115 is connected to the positive potential indicated.

The plate 116 is connected to a positive potential through resistance 117, and it is also connected to ground through resistance 118. The cathodes of tubes V10 and V11 are sufficiently negative to enable the plate of tube V11 to drop below ground.

The plate 116 of tube V11 is also connected to the plates 119, 120 of the respective disconnect diodes V12 and V13. The cathode 121 of diode V12 is connected to the grid 122 of the sawtooth generator tube V14, said grid being returned to the negative potential indicated through resistance 123. The plate 124 of tube V14 is returned to the positive potential indicated through resistance 125.

The plate 124 of tube V14 is also connected through neon glow tube 126 and resistance 127 to the grid 128 of cathode follower tube V15, said grid being returned to the negative potential indicated through resistance 129. Capacitance 130 shunts the neon tube 126 and resistance 127 to preserve the high frequency gain to grid 128. The cathode 131 of tube V15 is connected to the cathode 132 of diode V13. The cathode 131 is also returned to the negative potential indicated through resistance 133. Timing capacitor 135 is connected between the cathode of cathode follower tube V15 and grid 122 of tube V14, as indicated.

The grid 136 of cathode follower tube V16 is connected to the tap on potentiometer resistance 133, while the cathode 137 is connected to the grid 138 of cathode follower tube V17. The cathode 137 is returned to the negative potential indicated through resistance 139, and to ground through capacitance 140. The cathode 141 of cathode follower V17 is connected to the cathode 142 of cathode follower tube V18, both cathodes being returned to the negative potential indicated through resistance 105. The cathode 145 of tube V19 is also connected to the cathode 142 of tube V18. The grid 146 of tube V19 is connected to the tap on potentiometer resistance 147 which is connected between the negative potential indicated and ground. The screen grid 148 is connected to the positive potential indicated and the plate 149 is connected through resistance 150 and switch 151 to the positive potential indicated.

The plate 149 of cathode follower tube V19 is also connected to the grid 143 of tube V18 through the parallel combination of resistance 152 and capacitance 153. In this manner tubes V18 and V19 become a bistable multivibrator, for purposes described in detail hereinafter.

The plate 154 of amplifier tube V20 is also connected to the grid 143 of cathode follower tube V18 through the compensated voltage divider comprising resistances 144 and 152 and capacitance 153. The screen grid 155 of tube V20 is connected to a positive potential, as indicated, and the cathode 156 is connected to the negative potential indicated through the parallel combination of resistance 157 and capacitance 158. The control grid 159 is connected to a negative potential of about −50 volts, as indicated, through resistance 160. This grid is also connected through capacitance 161 to terminal 162 to which is connected the source of external trigger signals 163. Clamping diode V21 is connected between ground and the plate 154 of tube V20 to clamp said plate to ground.

In the circuit shown in Figure 6, and described in detail hereinbefore, the sweep multivibrator is of the direct coupled, bistable type, with tube V10 being the positive-going side. In the rest or quiescent state tube V10 is conducting. Tube V11 is the negative-going side which, in the rest or quiescent state, is cut off. The biases and plate loads are chosen so that when tube V10 is conducting, the grid of tube V11 is held below cut-off, and when tube V11 is conducting, the cathode of tube V10 is held sufficiently positive to hold V10 cut off.

To return the multivibrator to the rest state, with tube V10 conducting, there is required at the grid of tube V10 a positive voltage which is high enough to cause plate current to flow. The positive voltage for this purpose is supplied from the sweep waveform, as explained more fully hereinafter. Potentiometer 147 functions to adjust the grid voltage of cathode follower tube V19 which, in turn, determines the voltage level of grid 104 during the rest state of tube V10. Various voltage levels may be provided, as explained in detail hereinafter.

The general operation of the circuit described hereinbefore is as follows: When a negative trigger signal 100 is applied to the grid 104, tube V10 is cut off and the resulting positive pulse 171 at plate 109 is coupled to the grid 113 of tube V11, thereby raising said grid above cut-off and causing plate current to flow. The resulting rise of cathode 107 also raises cathode 106, whereby tube V10 is removed still further from conduction. The negative step 172 from the plate 116 of tube V11 is applied to the plates of the disconnect diodes V12 and V13.

In the quiescent state between sweeps, the plates of diodes V12 and V13 rest, for example, at −3.5 volts. The negative step to the diode plates lowers these plates below their cathodes, thus breaking the direct coupled feedback loop from plate 124 to grid 122 of tube V14. The linear rise of the cathode 131 of cathode follower tube V15 is used as the sweep sawtooth 173 which may be applied, for example, to the deflection plates of a cathode ray tube oscilloscope (not shown), by connection at terminal 170. It will be understood that the values of timing capacitor 135 and charging resistor 123 may be varied to cover a wide range of sawtooth slopes. Further, the length of the sweep may be adjusted by means of potentiometer resistance 133.

The cathode 131 of cathode follower tube V15 continues to rise linearly until a positive step from the sweep multivibrator tube V11 returns the disconnect diode plates 119, 120 to their quiescent state. Such a positive step occurs when the grid 104 of multivibrator tube V10 is brought positive enough to revert the multivibrator, and this is provided by the sawtooth sweep 173 which is coupled back through cathode follower tubes V16 and V17 to the grid 104. Capacitor 140 on the cathode 137 of tube V16 functions to delay the negative-going portion 174 of the sweep, whereby to retard the return of grid 104 to the quiescent level after the passage of the positive pulse. Thus, all trigger signals 100 are prevented from retriggering the multivibrator until all other capacitances in the circuit have had time to reach their quiescent voltage levels. The size of capacitor 140 may be varied so that more recovery time is permitted for slower sweeps and the least necessary recovery time is allowed for the faster sweeps.

The operation of the sweep multivibrator is controlled in both of its stable states by the potential at grid 104. Over a certain region of its control the grid exhibits hysteresis, and this region is defined in waveform A, Figure 7 by the lower limit 176 and the upper limit 177. Within this region, tube V10 is conducting when the region is approached from the upper limit and tube V10 is cut off when the region is approached from the lower limit. Thus, during the time of the positive-going sweep 173 tube V10 is cut off and during the delayed time of the negative-going portion 174 tube V10 is conductinng.

In order for the multivibrator to be controlled by the sawtooth waveform applied to grid 104, the magnitude of this waveform is selected, by proper values of circuit components, to be capable of extending across these hysteresis limits. This is indicated in Figure 7 by waveform A, wherein the sawtooth waveform 173 is shown to originate below the lower hysteresis limit 176 at the cut-off bias level 178 of tube V17 and to terminate slightly above the upper limit 177. The original negative-going return portion of this sweep waveform is shown in dotted line to return to this originating level. The delayed return 174 is shown to trigger the multivibrator, i. e. with V11 conducting, when it crosses the lower hysteresis limit 176.

The delay between triggering of the multivibrator and the start of the grid rise is due to the time required for the sawtooth sweep to rise from the quiescent level 178 to the more positive voltage level 179 of the cathode 145 of tube V19.

Four modes of trigger hold-off operation are provided by the circuit shown in Figure 6. Two of these modes obtain with switch 151 in the position identified as Sweep Normal. In this position, the plates of tube V19 and V20 are disconnected from the positive voltage source, and hence the plate of tube V19 drops to the potential of the −150 volt supply. Simultaneously, the grid 143 of tube V18 also drops to this negative potential and is therefore cut off permanently. Screen current furnishes the cathode current of tube V19, and therefore the stability control potentiometer 147 may be adjusted over its range to control the voltage applied to grid 104 of tube V10.

In one mode of operation, this control 147 is adjusted to set the grid voltage of tube V10 just below the lower hysteresis level 176, as indicated in waveform A in Figure 7. In this mode of operation the multivibrator is free-running and requires no trigger signal 100, since the sawtooth sweep functions on its negative-going return automatically to revert the multivibrator and initiate another sweep.

A second mode of operation obtains with switch 151 in the position identified as Sweep Normal, when the stability control potentiometer 147 is adjusted to set the quiescent grid voltage of tube V10 just above the lower hysteresis limit 176. As indicated by waveform B in Figure 7, the delayed negative-going portion 174 of the sawtooth sweep returns to a quiescent level above the lower hysteresis limit, and thus requires a trigger signal 100 to intercept this lower level to trigger the sweep multivibrator. Thus, a subsequent sawtooth sweep is produced only upon triggering of the multivibrator by a negative trigger signal 100.

A third mode of operation occurs with switch 151 in the position identified as Sweep Delayed, and this mode is illustrated by waveform C in Figure 7. Voltage is now supplied to the plates of tubes V19 and V20, with tube V19 functioning with tube V18 to form a bistable multivibrator. In the quiescent state, tube V18 conducts and holds the common cathode voltage so high that tube V19 is cut off. A positive differentiated trigger pulse 163 applied to grid 159 of tube V20 produces a negative pulse at plate 154 which is coupled to the grid 143 of tube V18. Thus, this tube is cut off and tube V19 is caused to conduct.

In the stable state wherein tube V18 is conducting, said tube determines the voltage level of the common cathode circuits 142, 145, and this level 180 is high enough above the lower hysteresis level 176 to hold off tube V10 from being returned to a conducting state, even in the presence of the negative trigger. Upon triggering of the hold-off multivibrator by an external trigger signal 163, with tube V19 conducting, said latter tube controls the common cathode voltage level, and this level 181 is lower than in the first state. Thus, by adjustment of potentiometer 147 the grid voltage of tube V10 may be placed at or below the lower hysteresis limit 176 and the sweep multivibrator will be triggered upon triggering of the hold-off multivibrator by the external trigger signal 163. At the end of the positive-going sweep, the hold-off cathode follower tube V17 raises the common cathode level of cathodes 142, 145 momentarily, thereby reverting the hold-off multivibrator with tube V18 conducting and tube V19 cut off.

It is to be noted here that the potential of cathodes 142 and 145 is controlled by tube V17 until the sweep waveform has recovered completely and is maintained above the conduction level of tube V19 during that time. Accordingly, no external trigger signal 163 can revert the hold-off multivibrator prematurely.

A fourth mode of operation obtains with switch 151 in the position identified as Sweep Delayed and illustrated by waveform D in Figure 7. By setting the cathode level by means of the stability potentiometer 147 slightly above the lower hysteresis limit 176, the sweep will not be triggered while tube V19 is conducting, but the grid 104 of tube V10 will be placed close enough to triggering that a negative trigger pulse 100 from a trigger source will trigger the sweep multivibrator and initiate a sweep.

Thus, in the first mode of operation the delayed sawtooth sweep 173, 174 fed back to grid 104 operates recurrently to trigger the sweep multivibrator. In the second mode of operation the sweep multivibrator is triggered by a negative trigger signal 100, after the circuit components have returned to their quiescent levels, as afforded by the delayed sawtooth sweep fed back to grid 104. In the third mode of operation the positive trigger pulse 163 actually controls the triggering of the sweep multivibrator. In the fourth mode the positive trigger pulse 163 functions to revert the hold-off multivibrator to cause conduction of tube V19. The voltage on grid 104 is set close enough to triggering that the next negative trigger pulse 100 will trigger a sweep multivibrator. The fourth mode of operation, when used in connection with a cathode ray tube oscilloscope, permits the display of delayed signals without jitter, even if the signal itself jitters.

In each of the modifications illustrated in the drawings and described hereinbefore, triggering of the sweep multivibrator is effected at a predetermined level of potential applied to a control element and the return of this control element to said triggering level after reversing of the multivibrator is controlled by a delayed hold-off signal which is initiated by the signal produced by reversion of the multivibrator. The hold-off signal is either mixed with a trigger signal which will return the control element to triggering level, or the voltage level of the hold-off signal at its termination is adjusted to return the control element to the triggering potential of the sweep multivibrator. Thus, each of the hold-off circuits functions to control the stability of the multivibrator, to prevent improper operation as well as premature triggering.

It will be apparent to those skilled in the art that many modifications and changes may be made in the illustrated arrangements described in detail hereinbefore without departing from the scope and spirit of this invention. For example, transistors may be substituted for the vacuum tubes, if desired, and they are intended to be included in the term electron discharge device as employed in the appended claims. As another example of modification, it will be apparent that the hold-off signal may be derived from or initiated by any waveform produced by actuation of the multivibrator, as by either of the tubes V10 and V11 in Figure 6, it being required only that the hold-off signal be initiated by reversion of the multivibrator and that the hold-off signal be delayed a predetermined time after reversion so that the return of the control element to triggering level is delayed sufficiently to allow all of the circuit elements to return completely to their quiescent states.

Still further, the hold-off circuits and method of the present invention are applicable to multivibrators of various types. A bistable multivibrator is illustrated in Figure 6 for purposes of circuit simplicity and explanation, but mono-stable multivibrators are also applicable to the present invention. In any case it is required only that triggering of the multivibrator be controlled by a predetermined level of potential applied to a suitable control element of the multivibrator, such as the cathode, control grid or suppressor grid of one of the multivibrator vacuum tubes. Further, it will be apparent that when differentiated trigger signals are employed to trigger the multivibrator, they need not be applied to the same element that carries the control potential, it being required only that the trigger signals be applied to an element which is so associated with the control element as to effect mixing of the trigger signals and the hold-off signal. Accordingly, it is to be understood that the foregoing description is merely illustrative and is not to be considered in a limiting sense.

Having now described our invention and the manner in which the same may be used, what we claim as new and desire to secure by Letters Patent is:

1. A multivibrator characterized by having a recovery time after reversion and comprising a triggering control element, direct current circuit means connected to the triggering control element for supplying electric potential to the latter, a signal producing element at which an electric signal is produced upon triggering of the multivibrator, the multivibrator being triggered at a predetermined level of potential of the triggering control element, the triggering control element being removed from said triggering potential upon triggering of the multivibrator and returned toward said triggering potential upon reversion of the multivibrator, and timed delay means in the said direct current circuit means for delaying the return of the triggering control element toward said triggering potential for a predetermined time after reversion of the multivibrator and exceeding said recovery time.

2. A multivibrator characterized by having a recovery time after reversion and comprising a triggering control element, circuit means for the triggering control element for supplying electric potential to the latter, a signal producing element at which an electric signal is produced upon triggering of the multivibrator, the multivibrator being triggered at a predetermined level of potential of the triggering control element, the triggering control element being removed from said triggering potential upon triggering of the multivibrator and returned toward said triggering potential upon reversion of the multivibrator, blocking potential producing means connected by a direct current path to the triggering control element to provide at the latter a blocking potential which is delayed in time and is of such polarity and magnitude as to delay the return of the triggering control element toward said triggering potential for a predetermined time after reversion of the multivibrator and exceeding said recovery time, and means connecting the signal producing element to the blocking potential producing means for actuating the latter by the produced electric signal.

3. In combination with a multivibrator having a triggering control element and wherein said multivibrator is triggered at a predetermined level of potential of said control element and wherein said control element is removed from said triggering level upon triggering of the multivibrator and is returned toward said triggering level upon reversion of the multivibrator, the multivibrator being characterized by having a recovery time after reversion: means for preventing triggering of the multivibrator for a predetermined time after reversion and exceeding said recovery time, comprising a source of electric blocking potential of magnitude and polarity capable of preventing return of the control element to a level of potential for triggering after said reversion, and direct current coupling means connecting said source of electric blocking potential to the control element for said predetermined time whereby to prevent said return for said time.

4. In combination with the multivibrator having a triggering control element and a signal producing element and wherein said multivibrator is triggered at a predetermined level of potential of said control element to produce an electric signal at said signal producing element, and wherein said control element is removed from said triggering level of potential upon triggering of the multivibrator and is returned toward said triggering level of potential upon reversion of the multivibrator, the multivibrator being characterized by having a recovery time after reversion: means for preventing triggering of the multivibrator for a predetermined time after said reversion and exceeding said recovery time, said means comprising blocking potential producing means connected to the triggering control element by a direct current coupling to provide at the triggering control element a blocking potential which is delayed in time and is of such polarity and magnitude as to delay the return of the triggering control element toward said triggering potential for said predetermined time after reversion of the multivibrator and means connecting the signal producing element to the blocking potential producing means for actuating the latter by said electric signal.

5. The device of claim 4 wherein the blocking potential producing means includes hold-off signal waveform producing means connected to said signal producing element and actuated by the signal produced by the latter to produce a hold-off waveform delayed a predetermined time after reversion of the multivibrator and exceeding the recovery time of the latter, and means conductively connecting the hold-off waveform to the said triggering control element for delaying the return of the latter toward said triggering potential after reversion of the multivibrator for said predetermined time.

6. The device of claim 4 wherein the blocking potential producing means includes signal shaping means conductively connecting the signal producing element to the triggering control element, the signal shaping means functioning to provide a hold-off signal having a predetermined lesser slope than the original signal produced by reversion of the multivibrator, whereby to delay the return of the triggering control element toward said triggering potential for a predetermined time after reversion of the multivibrator and exceeding the recovery time of the latter.

7. The device of claim 4 wherein the blocking potential producing means includes a resistance-capacitance network.

8. The device of claim 4 wherein the blocking potential producing means includes a hold-off multivibrator.

9. The device of claim 4 wherein the blocking potential producing means includes a trigger-actuated hold-off multivibrator.

10. The device of claim 4 wherein the blocking potential producing means includes a sawtooth generator.

11. In combination with a multivibrator characterized by having a recovery time after reversion and having a triggering control element and direct current circuit means connecting the control element to a source of potential, and wherein said multivibrator is triggered at a predetermined level of potential of said control element and wherein said control element is removed from said triggering level upon triggering of the multivibrator and is returned toward said triggering level upon reversion of the multivibrator, the multivibrator also including a signal producing element at which an electric signal is produced upon triggering of the multivibrator; means for preventing triggering of the multivibrator for a predetermined time after reversion of the multivibrator and exceeding the recovery time of the latter, comprising timed delay means in the said direct current circuit means for delaying for a predetermined time the return of the control element toward said triggering level upon reversion of the multivibrator, and means conductively connecting the signal producing element to the timed delay means for actuating the latter by said electric signal.

12. The device of claim 11 wherein the timed delay means includes a resistance-capacitance network.

13. The device of claim 11 wherein the timed delay means includes a hold-off multivibrator.

14. The device of claim 11 wherein the timed delay means includes a trigger-actuated hold-off multivibrator and a source of external triggers therefor.

15. In combination with a trigger signal source and a multivibrator having a triggering control element and a signal producing element and wherein said control element has a normal quiescent level of potential and wherein said multivibrator is triggered at a predetermined level of potential of said control element removed from said quiescent level to produce an electric signal at said signal producing element, the multivibrator being characterized by having a recovery time after reversion: means for preventing triggering of the multivibrator for a predetermined time after said reversion and exceeding said recovery time, said means comprising blocking potential producing means connected to the triggering control element by a direct current coupling to provide at the triggering control element the blocking potential which is delayed in time and is of such polarity and magnitude as to delay the return of the triggering control element to said quiescent level of potential for said predetermined time after reversion of the multivibrator, means connecting the signal producing element to the blocking potential producing means for actuating the latter by said electric signal, and means connecting the trigger signal source to the multivibrator at a position associated with the triggering control element to effect mixing of the trigger signal and the control potential, the trigger signal functioning to return said triggering control element to the triggering level after the delayed return of the control element to its normal quiescent level of potential.

16. In combination with a trigger signal source and a multivibrator characterized by having a recovery time after reversion and having a triggering control element and direct current circuit means connecting the control element to a source of potential, and wherein the multivibrator has a normal quiescent level of potential and is triggered at a predetermined level of potential of said control element removed from said quiescent level and wherein said control element is removed from said quiescent level upon triggering of the multivibrator and is returned to said quiescent level upon reversion of the multivibrator, the multivibrator also including a signal producing element at which an electric signal is produced upon triggering of the multivibrator: means for preventing triggering of the multivibrator for a predetermined time after reversion of the multivibrator and exceeding the recovery time of the latter, comprising timed delay means in the said direct current circuit means for delaying for a predetermined time the return of the control element to said quiescent level upon reversion of the multivibrator, means conductively connecting the signal producing element to the timed delay means for actuating the latter by said electric signal, and means connecting the trigger signal source to the multivibrator at a position associated with the triggering control element to effect mixing of the trigger signal and the control potential, the trigger signal functioning to return said triggering control elements to the triggering level after the delayed return of the control element to its normal quiescent level of potential.

17. The device of claim 16 wherein the timed delay means includes a resistance-capacitance network.

18. The device of claim 16 wherein the timed delay means includes a hold-off multivibrator.

19. The device of claim 16 wherein the timed delay means includes a trigger-actuated hold-off multivibrator and a source of external triggers therefor.

20. In combination with a trigger signal source and a multivibrator characterized by having a recovery time after reversion and having a triggering control element and circuit means connecting the control element to a source of potential, and wherein the multivibrator has a normal quiescent level of potential and is triggered at a predetermined level of potential of said control element removed from said quiescent level upon triggering of the multivibrator and is returned to said quiescent level upon reversion of the multivibrator, the muitivibrator also including a signal producing element at which an electric signal is produced upon triggering of the multivibrator: means for preventing triggering of the multivibrator for a predetermined time after reversion of the multivibrator and exceeding the recovery time of the latter, comprising signal shaping means providing a direct current coupling of the signal producing element to the triggering control element, the signal shaping means functioning to provide a hold-off signal having a predetermined lesser slope than the original signal produced by reversion of the multivibrator, whereby to delay the return of the triggering control element toward said quiescent potential for a predetermined time, timed delay means in the circuit means for delaying for a predetermined time the return of the control element to said quiescent level upon reversion of the multivibrator, means conductively connecting the hold-off signal to the timed delay means for actuating the latter by said hold-off signal, and means connecting the trigger signal source to the multivibrator at a position associated with the triggering control element to effect mixing of the trigger signal and the control potential, the trigger signal functioning to return said triggering control element to the triggering level after the delayed return of the control element to its quiescent level of potential.

References Cited in the file of this patent

UNITED STATES PATENTS

| | | |
|---|---|---|
| 2,399,135 | Miller et al. | Apr. 23, 1946 |
| 2,515,271 | Smith, Jr., et al. | July 18, 1950 |
| 2,545,082 | Grosdoff | Mar. 13, 1951 |
| 2,557,770 | Scoles | June 19, 1951 |
| 2,562,295 | Chance | July 31, 1951 |
| 2,577,475 | Miller | Dec. 4, 1951 |
| 2,636,984 | Canfora | Apr. 28, 1953 |
| 2,688,079 | Wachtell | Aug. 31, 1954 |
| 2,748,272 | Schrock | May 29, 1956 |

UNITED STATES PATENT OFFICE
CERTIFICATE

Patent No. 2,853,609 Patented September 23, 1958

Richard L. Ropiequet and John R. Kobbe

Application having been made jointly by Richard L. Ropiequet and John R. Kobbe, the inventors named in the patent above identified, and Tektronix, Inc., a corporation of Oregon, the assignee, for the issuance of a certificate under the provisions of Title 35, Section 256 of the United States Code, deleting the name of the said John R. Kobbe from the patent as a joint inventor, and a showing and proof of facts satisfying the requirements of said section having been submitted, it is this 17th day of March, 1959, certified that the name of said John R. Kobbe is hereby deleted from the said patent as a joint inventor with the said Richard L. Ropiequet.

[SEAL]

ARTHUR W. CROCKER,
*First Assistant Commissioner of Patents.*

Disclaimer 2,853,609.—*Richard L. Ropiequet*, Portland, Oreg. MULTIVIBRATOR HOLD OFF CIRCUIT. Patent dated Sept. 23, 1958. Disclaimer filed Sept. 13, 1962, by the assignee, *Tektronix, Inc.*

Hereby enters this disclaimer to claim 20 of said patent.

[*Official Gazette November 6, 1962.*]